US012596104B2

(12) United States Patent
Wang et al.

(10) Patent No.: US 12,596,104 B2
(45) Date of Patent: Apr. 7, 2026

(54) DEVICE AND METHOD FOR DETECTING FITTING DEGREE OF CONNECTING ROD BUSHING BY ULTRASONIC WAVE

(71) Applicant: GUANGDONG UNIVERSITY OF TECHNOLOGY, Guangzhou (CN)

(72) Inventors: Guan Wang, Guangzhou (CN); Jieyu Zhu, Guangzhou (CN); Peilin Su, Guangzhou (CN); Guohua Chen, Guangzhou (CN); Huisheng Jiao, Guangzhou (CN); Zanfeng Liu, Sihui (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 399 days.

(21) Appl. No.: 18/348,258

(22) Filed: Jul. 6, 2023

(65) Prior Publication Data

US 2024/0248065 A1     Jul. 25, 2024

(30) Foreign Application Priority Data

Jan. 19, 2023     (CN) ......................... 202310077642.0

(51) Int. Cl.
| | |
|---|---|
| *G01N 29/04* | (2006.01) |
| *G01N 29/30* | (2006.01) |
| *G01N 29/44* | (2006.01) |

(52) U.S. Cl.
CPC ........... *G01N 29/041* (2013.01); *G01N 29/30* (2013.01); *G01N 29/4436* (2013.01); *G01N 2291/2696* (2013.01)

(58) Field of Classification Search
CPC .. G01N 29/041; G01N 29/30; G01N 29/4436; G01N 2291/2696; G01N 29/043; Y02E 30/30; G01B 5/0002; G01B 5/0004
See application file for complete search history.

(56) References Cited

U.S. PATENT DOCUMENTS

| | | | | |
|---|---|---|---|---|
| 10,012,618 | B2 * | 7/2018 | Carrasco Zanini | .... B62D 63/02 |
| 10,101,302 | B2 * | 10/2018 | Yamaoka | ............. G01N 29/265 |

FOREIGN PATENT DOCUMENTS

| | | | | |
|---|---|---|---|---|
| CN | 110160424 A | 8/2019 | | |
| CN | 215177512 U | 12/2021 | | |
| CN | 116164623 A | * 5/2023 | ............. | G01B 5/201 |
| CN | 117074527 A | * 11/2023 | ............. | G01N 29/04 |

* cited by examiner

*Primary Examiner* — Xin Y Zhong

(57)     ABSTRACT

Provided are a device and method for detecting a fitting degree of a connecting rod bushing by an ultrasonic wave. A big head hole fixture comprises multiple positioning blocks, and the positioning blocks in a transverse section have a common point; an ultrasonic probe is capable of moving up-down and left-right and rotating; a center of the ultrasonic probe, a center of the big hole fixture and a center of a connecting rod body fixture are located on a straight line; when the device works, a connecting rod is positioned and then the fitting degree of the connecting rod bushing is detected; the multiple positioning blocks are capable of moving and contacting with an inner wall of a big head hole, the connecting rod body fixture is capable of moving and clamping the connecting rod and the ultrasonic probe is capable of moving to contact with the connecting rod bushing.

12 Claims, 3 Drawing Sheets

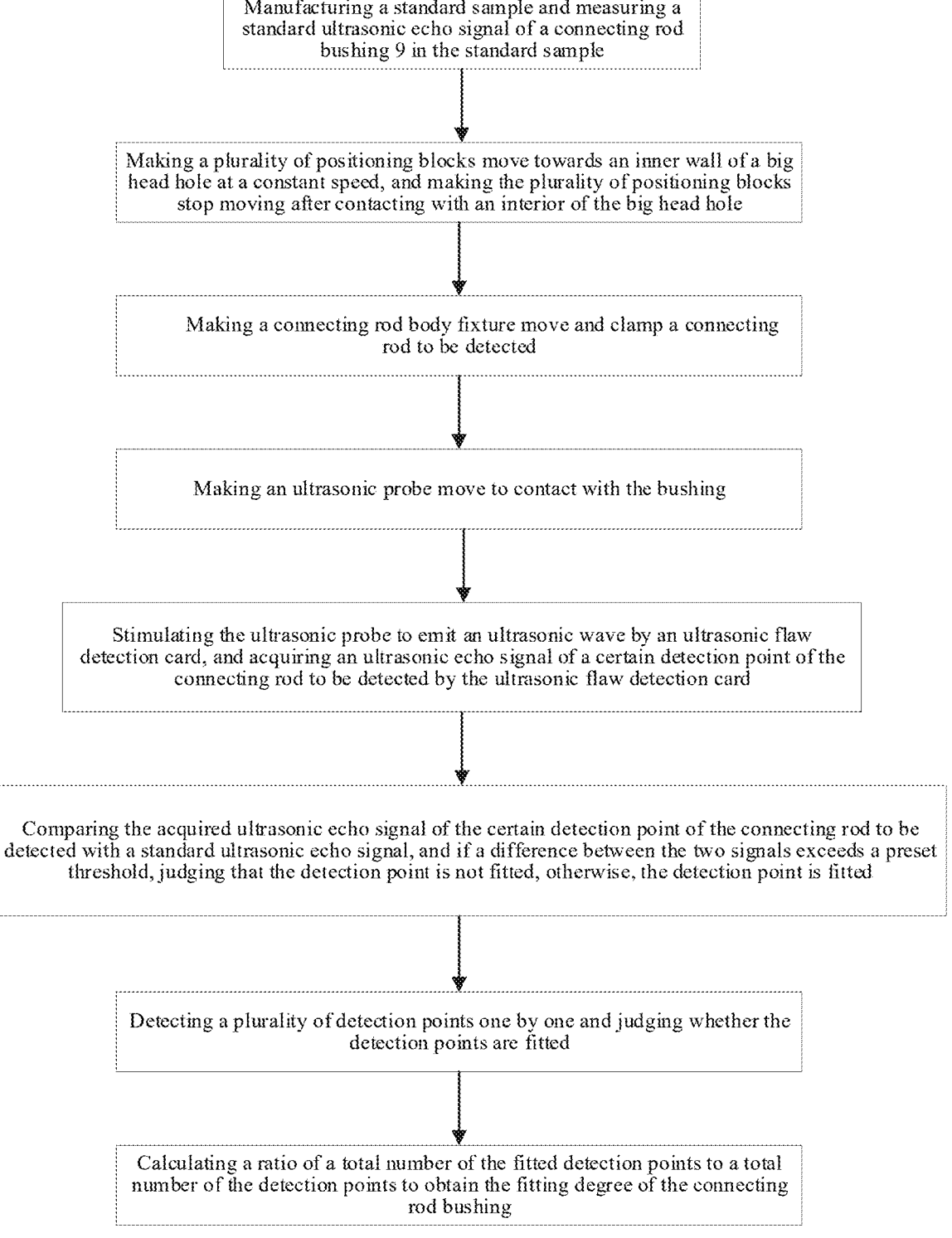

Manufacturing a standard sample and measuring a standard ultrasonic echo signal of a connecting rod bushing 9 in the standard sample Making a plurality of positioning blocks move towards an inner wall of a big head hole at a constant speed, and making the plurality of positioning blocks stop moving after contacting with an interior of the big head hole Making a connecting rod body fixture move and clamp a connecting rod to be detected Making an ultrasonic probe move to contact with the bushing Stimulating the ultrasonic probe to emit an ultrasonic wave by an ultrasonic flaw detection card, and acquiring an ultrasonic echo signal of a certain detection point of the connecting rod to be detected by the ultrasonic flaw detection card Comparing the acquired ultrasonic echo signal of the certain detection point of the connecting rod to be detected with a standard ultrasonic echo signal, and if a difference between the two signals exceeds a preset threshold, judging that the detection point is not fitted, otherwise, the detection point is fitted Detecting a plurality of detection points one by one and judging whether the detection points are fitted Calculating a ratio of a total number of the fitted detection points to a total number of the detection points to obtain the fitting degree of the connecting rod bushing

FIG. 5

DEVICE AND METHOD FOR DETECTING FITTING DEGREE OF CONNECTING ROD BUSHING BY ULTRASONIC WAVE

CROSS REFERENCE TO RELATED APPLICATIONS

This application claims foreign priority of Chinese Patent Application No. 202310077642.0 filed on Jan. 19, 2023 in the China National Intellectual Property Administration, the disclosures of all of which are hereby incorporated by reference.

TECHNICAL FIELD

The present invention relates to the technical field of fitting degree detection technologies for connecting rod bushings, and particularly to a device and method for detecting a fitting degree of a connecting rod bushing by an ultrasonic wave.

BACKGROUND OF THE PRESENT INVENTION

Connecting rod is a key part of an engine and bears a very high periodic load during working, a stress of the connecting rod is very complicated, and a quality of the connecting rod directly affects a performance and service life of the engine, so that a quality requirement for the connecting rod is getting higher and higher. A matching condition between a bushing and a hole of the connecting rod has an important influence on a use performance of the connecting rod, especially when there is a gap between the matched bushing and hole of the connecting rod, the use of the connecting rod will be seriously affected.

The bushing and a corresponding base hole are mostly assembled by interference fit, and are connected together by an intensity of pressure generated by interference fit with each other. The matching between the bushing and the connecting rod is influenced by a magnitude of interference, manufacturing accuracy and assembly accuracy, so that it is difficult to form complete assembly surfaces that contact with and are fitted with each other. If a fitting rate of the assembly surfaces is low and the intensity of pressure generated by interference fit is relatively small, there may be relative rotation or falling off, and safety accidents will occur in serious cases.

A traditional method for detecting a fitting degree of a connecting rod bushing is a destructive sampling method. For example, the bushing coated with red lead powder on an outer wall is pressed into the small head hole of the connecting rod according to a normal assembly method and then pressed out, the red lead powder at a joint may peel off, and then a transparent tape is used to transfer a trace on an outer surface of the bushing by rubbing and adhered to prefabricated grid paper, so as to judge a fitting area.

There are many shortcomings in the traditional method for detecting the fitting degree of the connecting rod bushing:

(1) workpieces are destroyed, and resources are wasted;

(2) only sampling detection can be carried out, and the reliability is low; and (3) manual operation is carried out, and the detection efficiency is low.

SUMMARY OF PRESENT INVENTION

In order to solve the technical problems in the prior art, the present invention provides a device and method for detecting a fitting degree of a connecting rod bushing by an ultrasonic wave, a connecting rod is placed on the device for detecting the fitting degree of the connecting rod bushing by the ultrasonic wave when in use, and the device comprises a mobile platform, a rack, a fixture assembly and a detection assembly; the rack comprises a top portion, a bottom portion and a side wall; the side wall is provided with an opening on an opposite side, and the top portion and the bottom portion are opposite, and are both perpendicular to the side wall; the mobile platform is mounted on the top portion of the rack; the fixture assembly comprises a big head hole fixture, a connecting rod body fixture and a fixture base; the detection assembly comprises an ultrasonic probe and a computer; the big head hole fixture comprises a plurality of positioning blocks, the positioning blocks in a transverse section have a common point, and the common point is located in a center of circle of the big head hole when the connecting rod is placed on the device for detecting the fitting degree of the connecting rod bushing by the ultrasonic wave; the fixture base is arranged on an upper surface of the bottom portion of the rack, the ultrasonic probe is arranged at one end of an upper surface of the fixture base, and the ultrasonic probe is capable of moving up-down and left-right, and is capable of rotating; the big head hole fixture and the connecting rod body fixture are arranged at the other end of the upper surface of the fixture base; a center of the ultrasonic probe, a center of the big hole fixture and a center of the connecting rod body fixture are located on a straight line; the ultrasonic probe is connected with the computer; the plurality of positioning blocks are capable of moving and contacting with an inner wall of the big end hole, and stop moving after contacting with the inner wall of the big end hole, the connecting rod body fixture is capable of moving and clamping the connecting rod, and the ultrasonic probe is capable of moving to contact with the connecting rod bushing. The present invention can adapt to the positioning and clamping of connecting rods with different sizes without damaging an integrity of the connecting rods, thus reducing an economic loss and improving a yield; and avoiding an error of manual judgment and improving detection accuracy and detection efficiency.

The present invention provides a device for detecting a fitting degree of a connecting rod bushing by an ultrasonic wave, a connecting rod being placed on the device for detecting the fitting degree of the connecting rod bushing by the ultrasonic wave when in use, wherein the device comprises a mobile platform, a rack, a fixture assembly and a detection assembly;

the rack comprises a top portion, a bottom portion and a side wall; and the side wall is provided with an opening on an opposite side, and the top portion and the bottom portion are opposite, and are both perpendicular to the side wall;

the mobile platform is mounted on the top portion of the rack;

the fixture assembly comprises a big head hole fixture, a connecting rod body fixture and a fixture base;

the detection assembly comprises an ultrasonic probe and a computer;

the big head hole fixture comprises a plurality of positioning blocks, the positioning blocks in a transverse section have a common point, and the common point is located in a center of circle of the big head hole when the connecting rod is placed on the device for detecting the fitting degree of the connecting rod bushing by the ultrasonic wave;

the fixture base is arranged on an upper surface of the bottom portion of the rack, the ultrasonic probe is arranged at a lower end of the mobile platform, and the ultrasonic probe is capable of moving up-down and left-right, and is capable of rotating;

the big head hole fixture and the connecting rod body fixture are arranged on an upper surface of the fixture base;

the ultrasonic probe is connected with the ultrasonic flaw detection card, the ultrasonic flaw detection card is connected with the computer, the ultrasonic flaw detection card is capable of stimulating the ultrasonic probe to emit the ultrasonic wave, and the ultrasonic flaw detection card collects echo data and sends the echo data back to the computer for analysis; and the plurality of positioning blocks are capable of moving and contacting with an inner wall of the big end hole, and stop moving after contacting with the inner wall of the big end hole, the connecting rod body fixture is capable of moving and clamping the connecting rod, and the ultrasonic probe is capable of moving to attach to the connecting rod bushing.

Preferably, each positioning block is provided with a positioning block sliding rail, and the positioning block is capable of moving along the corresponding sliding rail.

Preferably, when the device for detecting the fitting degree of the connecting rod bushing by the ultrasonic wave works, the plurality of positioning blocks move at a constant speed from the common point to a direction far away from the common point.

Preferably, an included angle between two adjacent positioning blocks in the transverse section is less than or equal to 120 degrees.

Preferably, three positioning blocks are provided, and an included angle between adjacent positioning blocks in the transverse section is 120 degrees.

Preferably, the connecting rod body fixture comprises two clamping blocks arranged oppositely.

Preferably, a longitudinal section of the clamping block is arc-shaped.

Preferably, the clamping block is an elastomer or an elastomer is arranged on an arc-shaped inner wall of the clamping block.

The present invention provides a method for detecting a fitting degree of a connecting rod bushing by an ultrasonic wave, which uses the device for detecting the fitting degree of the connecting rod bushing by the ultrasonic wave according to any one of the items above, and comprises the following steps of:

manufacturing a standard sample and measuring a standard ultrasonic echo signal of fitting of the connecting rod bushing in the standard sample;

making the plurality of positioning blocks move towards the inner wall of the big head hole at the constant speed, and making the plurality of positioning blocks stop moving after contacting with an interior of the big head hole;

making the connecting rod body fixture move and clamp a connecting rod to be detected;

making the ultrasonic probe move to contact with the bushing;

stimulating the ultrasonic probe to emit the ultrasonic wave by the ultrasonic flaw detection card, and acquiring an ultrasonic echo signal of a certain detection point of the connecting rod to be detected by the ultrasonic flaw detection card;

comparing the acquired ultrasonic echo signal of the certain detection point of the connecting rod to be detected with the standard ultrasonic echo signal, and if a difference between the two signals exceeds a preset threshold, judging that the detection point is not fitted, otherwise, the detection point is fitted;

detecting a plurality of detection points one by one and judging whether the detection points are fitted; and calculating a ratio of a total number of the fitted detection points to a total number of all detection points to obtain the fitting degree of the connecting rod bushing.

Preferably, the standard sample is a cuboid in a preset length-width range and a preset thickness range which is manufactured with a material of the connecting rod and a material of the bushing respectively.

Preferably, a matching state of the bushing in a small head hole of the connecting rod is simulated by applying a pressure to one side of the material of the bushing in the standard sample.

Preferably, the pressure P is calculated by the following formula:

$$P = \frac{\Delta}{d} \times \frac{1}{\dfrac{\left(\dfrac{d^2 + d_1^2}{d^2 - d_1^2} - \mu_1\right)}{E_1} + \dfrac{\left(\dfrac{d_2^2 + d^2}{d_2^2 - d^2} - \mu_2\right)}{E_2}}$$

wherein:

$\Delta$ is a magnitude of interference, which is specifically a difference between an outer diameter of the bushing and an inner diameter of the small head hole of the connecting rod;

$E_1$ and $E_2$ are elastic moduli of the material of the bushing and the material of the connecting rod respectively;

$\mu_1$ and $\mu_2$ are Poisson's ratios of the material of the bushing and the material of the connecting rod respectively;

$d_1$ and $d_2$ are an inner diameter of the bushing and an outer diameter of the small head hole respectively;

d is a nominal size of the outer diameter of the bushing or the inner diameter of the small head hole of the connecting rod; and P is a surface pressure of the bushing or the small head hole of the connecting rod.

Compared with the prior art, the present invention has the following beneficial effects.

1. According to the present invention, the big head hole fixture comprises the plurality of positioning blocks, and the plurality of positioning blocks in the transverse section have the common point, move along the sliding rail at the constant speed and stop moving after contacting with the inner wall of the big head hole, so that the connecting rods with different models may be positioned.

2. According to the present invention, the connecting rod body fixture comprises two clamping blocks arranged oppositely, the clamping block moves along the sliding rail, and the clamping block is the elastomer or the elastomer is arranged on the arc-shaped inner wall of the clamping block, so that the connecting rods with different models may be clamped.

3. The method for detecting the fitting degree of the connecting rod bushing by the ultrasonic wave of the present invention does not need to damage an integrity of the connecting rods, thus reducing an economic loss and improving a yield; and avoiding an error of manual judgment and improving detection quality and detection efficiency.

4. The present invention provides a method for acquiring an ultrasonic echo signal of fitting of a standard connecting rod bushing, so that the fitting degree detection is more accurate.

DESCRIPTION OF THE DRAWINGS

FIG. 5 is a flow chart of a method for detecting a fitting degree of a connecting rod bushing by an ultrasonic wave in one embodiment of the present invention.

Figure 1:
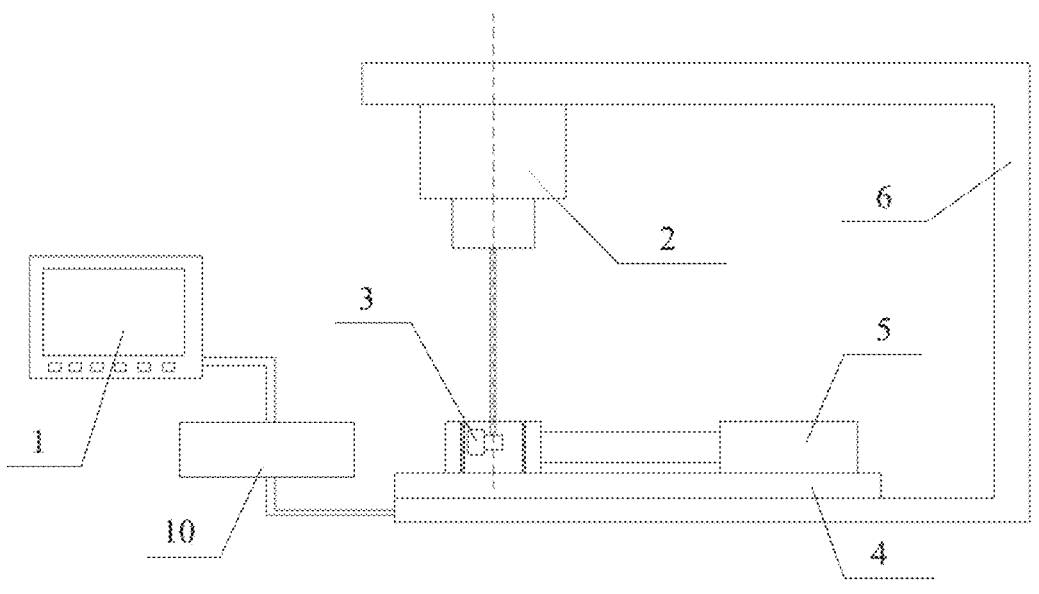
FIG. 1 is a perspective view of a front view of a device for detecting a fitting degree of a connecting rod bushing by an ultrasonic wave in one embodiment of the present invention during detection, wherein an ultrasonic probe has moved into the bushing.
Figure 2:
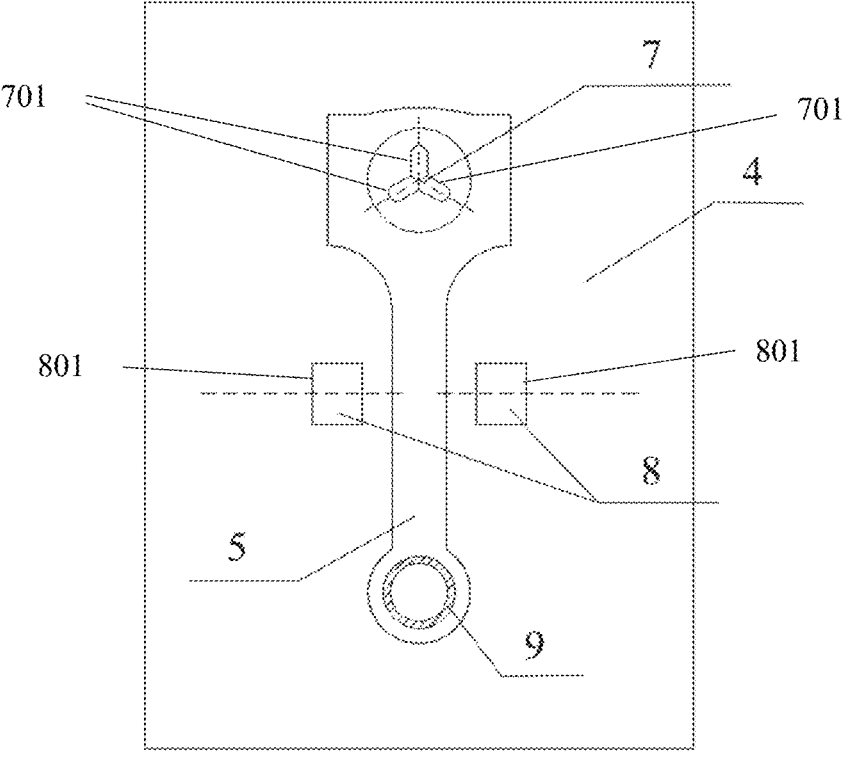
FIG. 2 is a top view of the device for detecting the fitting degree of the connecting rod bushing by the ultrasonic wave in one embodiment of the present invention from a mobile platform, wherein a connecting rod to be detected is placed on the device.

In the drawings, 1 refers to computer; 2 refers to mobile platform; 3 refers to ultrasonic probe; 4 refers to fixture base; 5 refers to connecting rod; 6 refers to rack; 7 refers to big head hole fixture; 8 refers to connecting rod bod fixture; 9 refers to bushing; 10 refers to ultrasonic flaw detection card; 11 refers to small head hole of connecting rod; 701 refers to positioning block; and 801 refers to clamping block.

DETAILED DESCRIPTION OF PREFERRED EMBODIMENTS

Specific embodiments of the present invention are described in detail hereinafter with reference to the drawings.

The present invention provides a device for detecting a fitting degree of a connecting rod bushing 9 by an ultrasonic wave, a connecting rod 5 is placed on the device for detecting the fitting degree of the connecting rod bushing 9 by the ultrasonic wave when in use, and the device comprises a mobile platform 2, a rack 6, a fixture assembly and a detection assembly.

The rack 6 comprises a top portion, a bottom portion and a side wall; and the side wall is provided with an opening on an opposite side, and the top portion and the bottom portion are opposite, and are both perpendicular to the side wall.

The mobile platform 2 is mounted on the top portion of the rack 6.

The fixture assembly comprises a big head hole fixture 7, a connecting rod body fixture 8 and a fixture base 4.

The detection assembly comprises an ultrasonic probe 3 and a computer 1.

The big head hole fixture 7 comprises a plurality of positioning blocks 701, the plurality of positioning blocks 701 in a transverse section have a common point, and the common point is located in a center of circle of the big head hole when the connecting rod 5 is placed on the device for detecting the fitting degree of the connecting rod bushing 9 by the ultrasonic wave.

The fixture base is arranged on an upper surface of the bottom portion of the rack 6, the ultrasonic probe 3 is arranged at a lower end of the mobile platform 2, and the ultrasonic probe 3 is capable of moving up-down and left-right, and is capable of rotating.

The big head hole fixture 7 and the connecting rod body fixture 8 are arranged on an upper surface of the fixture base 4.

The ultrasonic probe 3 is connected with an ultrasonic flaw detection card 10, the ultrasonic flaw detection card 10 is connected with the computer 1, the ultrasonic flaw detection card 10 is capable of stimulating the ultrasonic probe 3 to emit the ultrasonic wave, and the ultrasonic flaw detection card 10 collects echo data and sends the echo data back to the computer 1 for analysis.

The plurality of positioning blocks 701 are capable of moving and contacting with an inner wall of the big end hole, and stop moving after contacting with the inner wall of the big end hole, the connecting rod body fixture 8 is capable of moving and clamping the connecting rod 5, and the ultrasonic probe 3 is capable of moving to attach to the connecting rod bushing 9.

According to one specific embodiment of the present invention, each positioning block 701 is provided with a positioning block sliding rail, and the positioning block 701 is capable of moving along the corresponding sliding rail.

According to one specific embodiment of the present invention, when the device for detecting the fitting degree of the connecting rod bushing 9 by the ultrasonic wave works, the plurality of positioning blocks 701 move at a constant speed from the common point to a direction far away from the common point.

According to one specific embodiment of the present invention, an included angle between two adjacent positioning blocks 701 in the transverse section is less than or equal to 120 degrees.

According to one specific embodiment of the present invention, three positioning blocks 701 are provided, and an included angle between adjacent positioning blocks 701 in the transverse section is 120 degrees.

According to one specific embodiment of the present invention, the connecting rod body fixture 8 comprises two clamping blocks 801 arranged oppositely.

According to one specific embodiment of the present invention, a longitudinal section of the clamping block 801 is arc-shaped.

According to one specific embodiment of the present invention, the clamping block 801 is an elastomer or an elastomer is arranged on the arc-shaped inner wall of the clamping block 801, so that the connecting rods 5 with different models can be clamped.

The present invention provides a method for detecting a fitting degree of a connecting rod bushing 9 by an ultrasonic wave, which uses the device for detecting the fitting degree of the connecting rod 5 bushing by the ultrasonic wave according to any one of the items above, and comprises the following steps of:

manufacturing a standard sample and measuring a standard ultrasonic echo signal of fitting of the connecting rod bushing 9 in the standard sample;

making the plurality of positioning blocks 701 move towards the inner wall of the big head hole at the constant speed, and making the plurality of positioning blocks stop moving after contacting with an interior of the big head hole;

making the connecting rod body fixture 8 move and clamp a connecting rod 5 to be detected;

making the ultrasonic probe 3 move to contact with the bushing 9 in a small head hole 11 of the connecting rod;

stimulating the ultrasonic probe 3 to emit the ultrasonic wave by the ultrasonic flaw detection card 10, and acquiring an ultrasonic echo signal of a certain detection point of the connecting rod 5 to be detected by the ultrasonic flaw detection card 10;

comparing the acquired ultrasonic echo signal of the certain detection point of the connecting rod 5 to be detected with the standard ultrasonic echo signal, and if a difference between the two signals exceeds a preset threshold, judging that the detection point is not fitted, otherwise, the detection point is fitted;

detecting a plurality of detection points one by one and judging whether the detection points are fitted; and calculating a ratio of a total number of the fitted detection points to a total number of all detection points to obtain the fitting degree of the connecting rod bushing 9.

According to one specific embodiment of the present invention, the standard sample is a cuboid in a preset length-width range and a preset thickness range which is manufactured with a material of the connecting rod 5 and a material of the bushing 9 respectively.

According to one specific embodiment of the present invention, a matching state of the bushing in the small head hole of the connecting rod 5 is simulated by applying a pressure to one side of the material of the bushing 9 in the standard sample.

According to one specific embodiment of the present invention, the pressure P is calculated by the following formula:

$$P = \frac{\Delta}{d} \times \frac{1}{\left(\frac{d^2 + d_1^2}{d^2 - d_1^2} - \mu_1\right)}{E_1} + \frac{\left(\frac{d_2^2 + d^2}{d_2^2 - d^2} - \mu_2\right)}{E_2}$$

wherein:

$\Delta$ is a magnitude of interference, which is specifically a difference between an outer diameter of the bushing and an inner diameter of the small head hole of the connecting rod;

$E_1$ and $E_2$ are elastic moduli of the material of the bushing and the material of the connecting rod respectively;

$\mu_1$ and $\mu_2$ are Poisson's ratios of the material of the bushing and the material of the connecting rod respectively;

$d_1$ and $d_2$ are an inner diameter of the bushing and an outer diameter of the small head hole respectively;

d is a nominal size of the outer diameter of the bushing or the inner diameter of the small head hole of the connecting rod; and P is a surface pressure of the bushing or the small head hole of the connecting rod.

According to one specific embodiment of the present invention, a flow of detecting a fitting degree of a connecting rod bushing by an ultrasonic wave is as follows.

Figure 3:
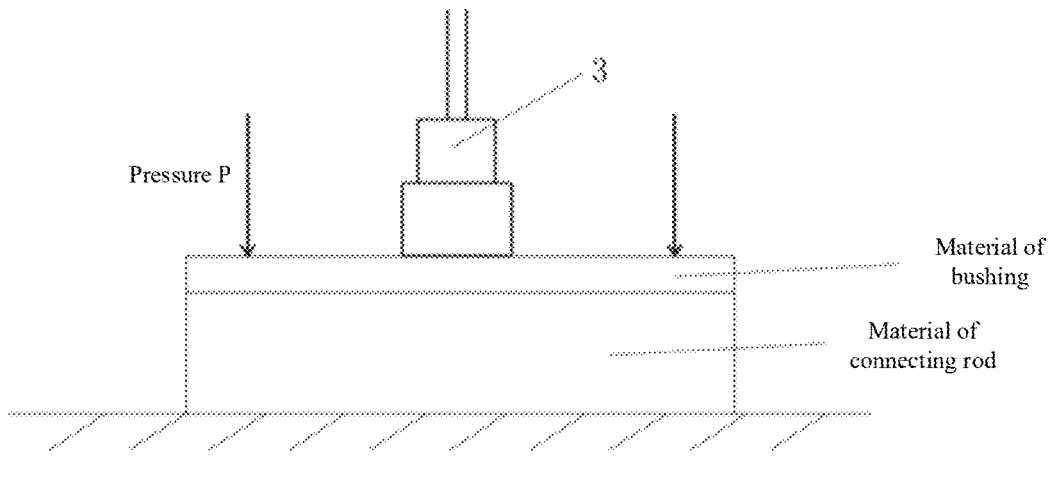
FIG. 3 is a front view of a standard sample in one embodiment of the present invention and a schematic diagram of a method for measuring a standard ultrasonic echo signal of a connecting rod bushing in the standard sample.
Figure 4:
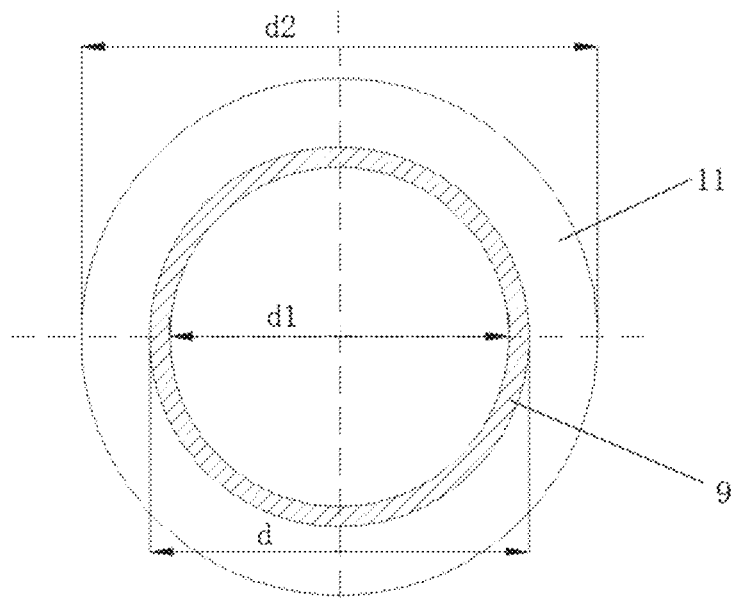
FIG. 4 is a schematic diagram of matching between the bushing and a small head hole in one embodiment of the present invention.

According to the size and material of the connecting rod to be detected, the sample as shown in FIG. 3 is manufactured.

A pressure F is calculated by the following formula, and a force with the same magnitude as the pressure F is applied to a surface of the sample, so as to simulate a fitting state of the bushing:

$$P = \frac{\Delta}{d} \times \frac{1}{\left(\frac{d^2 + d_1^2}{d^2 - d_1^2} - \mu_1\right)}{E_1} + \frac{\left(\frac{d_2^2 + d^2}{d_2^2 - d^2} - \mu_2\right)}{E_2}$$

The ultrasonic probe of the device for detecting the fitting degree of the connecting rod bushing by the ultrasonic wave detects the surface simulating the bushing in the manufactured sample, and the echo signal is recorded as the standard signal.

The actual connecting rod to be detected is placed on the fixture, and an instruction is sent through the computer 1 to start positioning:

firstly, three separate positioning blocks of the big head hole fixture move outwardly at an equal speed on their respective rails, and stop moving after contacting with the inner wall of the big head hole, so as to limit translational movement of the connecting rod; and subsequently, the connecting rod body fixture 8 moves relatively on the rail to clamp the connecting rod, so as to limit rotation of the connecting rod to complete the positioning of the connecting rod. According to sizes of the connecting rods with different models, moving distances of the big head hole fixture and the connecting rod body fixture are adjusted, so that the connecting rods with different models may be positioned.

After completing the positioning, a fitting degree detection process is started, and the ultrasonic probe 3 is fixed on the mobile platform 2, so that up-down, left-right and rotary motions may be realized.

The ultrasonic probe 3 moves to contact with the bushing during detection, and the computer 1 sends the instruction to control the ultrasonic flaw detection card to generate a stimulating signal to make the ultrasonic probe emit the ultrasonic wave. At the moment, the ultrasonic echo signal is transmitted to the computer 1 through the ultrasonic flaw detection card, and the computer 1 collects and displays the signal. Meanwhile, a fitting condition of this point is judged, and after completing the judgment, fitting conditions of other points are detected continuously. A ratio of a number of fitting points to a number of detection points is an overall fitting degree, and the larger the number of detection points is, the more accurate the fitting degree is.

Embodiment 1

According to one specific embodiment of the present invention, a device for detecting a fitting degree of a connecting rod bushing by an ultrasonic wave of the present invention is described in detail hereinafter.

The present invention provides a device for detecting a fitting degree of a connecting rod bushing 9 by an ultrasonic wave, a connecting rod 5 is placed on the device for detecting the fitting degree of the connecting rod bushing 9 by the ultrasonic wave when in use, and the device comprises a mobile platform 2, a rack 6, a fixture assembly and a detection assembly.

The rack 6 comprises a top portion, a bottom portion and a side wall; and the side wall is provided with an opening on an opposite side, and the top portion and the bottom portion are opposite, and are both perpendicular to the side wall.

The mobile platform 2 is mounted on the top portion of the rack 6.

The fixture assembly comprises a big head hole fixture 7, a connecting rod body fixture 8 and a fixture base 4.

The detection assembly comprises an ultrasonic probe 3 and a computer 1.

The big head hole fixture 7 comprises a plurality of positioning blocks 701, the plurality of positioning blocks 701 in a transverse section have a common point, and the common point is located in a center of circle of the big head hole when the connecting rod 5 is placed on the device for detecting the fitting degree of the connecting rod bushing 9 by the ultrasonic wave.

The fixture base is arranged on an upper surface of the bottom portion of the rack 6, the ultrasonic probe 3 is arranged at a lower end of the mobile platform 2, and the ultrasonic probe 3 is capable of moving up-down and left-right, and is capable of rotating.

The big head hole fixture 7 and the connecting rod body fixture 8 are arranged on an upper surface of the fixture base 4.

The ultrasonic probe 3 is connected with an ultrasonic flaw detection card 10, the ultrasonic flaw detection card 10 is connected with the computer 1, the ultrasonic flaw detection card 10 is capable of stimulating the ultrasonic probe 3 to emit the ultrasonic wave, and the ultrasonic flaw detection card 10 collects echo data and sends the echo data back to the computer 1 for analysis.

The plurality of positioning blocks 701 are capable of moving and contacting with an inner wall of the big end hole, and stop moving after contacting with the inner wall of the big end hole, the connecting rod body fixture 8 is capable of moving and clamping the connecting rod 5, and the ultrasonic probe 3 is capable of moving to attach to the connecting rod bushing 9.

Embodiment 2

According to one specific embodiment of the present invention, a device for detecting a fitting degree of a connecting rod bushing by an ultrasonic wave of the present invention is described in detail hereinafter.

The present invention provides a device for detecting a fitting degree of a connecting rod bushing 9 by an ultrasonic wave, a connecting rod 5 is placed on the device for detecting the fitting degree of the connecting rod bushing 9 by the ultrasonic wave when in use, and the device comprises a mobile platform 2, a rack 6, a fixture assembly and a detection assembly.

The rack 6 comprises a top portion, a bottom portion and a side wall; and the side wall is provided with an opening on an opposite side, and the top portion and the bottom portion are opposite, and are both perpendicular to the side wall.

The mobile platform 2 is mounted on the top portion of the rack 6.

The fixture assembly comprises a big head hole fixture 7, a connecting rod body fixture 8 and a fixture base 4.

The detection assembly comprises an ultrasonic probe 3 and a computer 1.

The big head hole fixture 7 comprises a plurality of positioning blocks 701, the plurality of positioning blocks 701 in a transverse section have a common point, and the common point is located in a center of circle of the big head hole when the connecting rod 5 is placed on the device for detecting the fitting degree of the connecting rod bushing 9 by the ultrasonic wave.

The fixture base is arranged on an upper surface of the bottom portion of the rack 6, the ultrasonic probe 3 is arranged at a lower end of the mobile platform 2, and the ultrasonic probe 3 is capable of moving up-down and left-right, and is capable of rotating.

The big head hole fixture 7 and the connecting rod body fixture 8 are arranged on an upper surface of the fixture base 4.

The ultrasonic probe 3 is connected with an ultrasonic flaw detection card 10, the ultrasonic flaw detection card 10 is connected with the computer 1, the ultrasonic flaw detection card 10 is capable of stimulating the ultrasonic probe 3 to emit the ultrasonic wave, and the ultrasonic flaw detection card 10 collects echo data and sends the echo data back to the computer 1 for analysis.

The plurality of positioning blocks 701 are capable of moving and contacting with an inner wall of the big end hole, and stop moving after contacting with the inner wall of the big end hole, the connecting rod body fixture 8 is capable of moving and clamping the connecting rod 5, and the ultrasonic probe 3 is capable of moving to attach to the connecting rod bushing 9.

Each positioning block 701 is provided with a positioning block sliding rail, and the positioning block 701 is capable of moving along the corresponding sliding rail.

When the device for detecting the fitting degree of the connecting rod bushing 9 by the ultrasonic wave works, the plurality of positioning blocks 701 move at a constant speed from the common point to a direction far away from the common point.

An included angle between two adjacent positioning blocks 701 in the transverse section is less than or equal to 120 degrees.

Embodiment 3

According to one specific embodiment of the present invention, a device for detecting a fitting degree of a connecting rod bushing by an ultrasonic wave of the present invention is described in detail hereinafter.

The present invention provides a device for detecting a fitting degree of a connecting rod bushing 9 by an ultrasonic wave, a connecting rod 5 is placed on the device for detecting the fitting degree of the connecting rod bushing 9 by the ultrasonic wave when in use, and the device comprises a mobile platform 2, a rack 6, a fixture assembly and a detection assembly.

The rack 6 comprises a top portion, a bottom portion and a side wall; and the side wall is provided with an opening on an opposite side, and the top portion and the bottom portion are opposite, and are both perpendicular to the side wall.

The mobile platform 2 is mounted on the top portion of the rack 6.

The fixture assembly comprises a big head hole fixture 7, a connecting rod body fixture 8 and a fixture base 4.

The detection assembly comprises an ultrasonic probe 3 and a computer 1.

The big head hole fixture 7 comprises a plurality of positioning blocks 701, the plurality of positioning blocks 701 in a transverse section have a common point, and the common point is located in a center of circle of the big head hole when the connecting rod 5 is placed on the device for detecting the fitting degree of the connecting rod bushing 9 by the ultrasonic wave.

The fixture base is arranged on an upper surface of the bottom portion of the rack 6, the ultrasonic probe 3 is arranged at a lower end of the mobile platform 2, and the ultrasonic probe 3 is capable of moving up-down and left-right, and is capable of rotating.

The big head hole fixture 7 and the connecting rod body fixture 8 are arranged on an upper surface of the fixture base 4.

The ultrasonic probe 3 is connected with an ultrasonic flaw detection card 10, the ultrasonic flaw detection card 10 is connected with the computer 1, the ultrasonic flaw detection card 10 is capable of stimulating the ultrasonic probe 3 to emit the ultrasonic wave, and the ultrasonic flaw detection card 10 collects echo data and sends the echo data back to the computer 1 for analysis.

The plurality of positioning blocks 701 are capable of moving and contacting with an inner wall of the big end hole, and stop moving after contacting with the inner wall of the big end hole, the connecting rod body fixture 8 is capable of moving and clamping the connecting rod 5, and the ultrasonic probe 3 is capable of moving to attach to the connecting rod bushing 9.

The connecting rod body fixture 8 comprises two clamping blocks 801 arranged oppositely.

A longitudinal section of the clamping block 801 is arc-shaped.

Embodiment 4

According to one specific embodiment of the present invention, a device for detecting a fitting degree of a connecting rod bushing by an ultrasonic wave of the present invention is described in detail hereinafter.

The present invention provides a device for detecting a fitting degree of a connecting rod bushing 9 by an ultrasonic wave, a connecting rod 5 is placed on the device for detecting the fitting degree of the connecting rod bushing 9 by the ultrasonic wave when in use, and the device comprises a mobile platform 2, a rack 6, a fixture assembly and a detection assembly.

The rack 6 comprises a top portion, a bottom portion and a side wall; and the side wall is provided with an opening on an opposite side, and the top portion and the bottom portion are opposite, and are both perpendicular to the side wall.

The mobile platform 2 is mounted on the top portion of the rack 6.

The fixture assembly comprises a big head hole fixture 7, a connecting rod body fixture 8 and a fixture base 4.

The detection assembly comprises an ultrasonic probe 3 and a computer 1.

The big head hole fixture 7 comprises a plurality of positioning blocks 701, the plurality of positioning blocks 701 in a transverse section have a common point, and the common point is located in a center of circle of the big head hole when the connecting rod 5 is placed on the device for detecting the fitting degree of the connecting rod bushing 9 by the ultrasonic wave.

The fixture base is arranged on an upper surface of the bottom portion of the rack 6, the ultrasonic probe 3 is arranged at a lower end of the mobile platform 2, and the ultrasonic probe 3 is capable of moving up-down and left-right, and is capable of rotating.

The big head hole fixture 7 and the connecting rod body fixture 8 are arranged on an upper surface of the fixture base 4.

The ultrasonic probe 3 is connected with an ultrasonic flaw detection card 10, the ultrasonic flaw detection card 10 is connected with the computer 1, the ultrasonic flaw detection card 10 is capable of stimulating the ultrasonic probe 3 to emit the ultrasonic wave, and the ultrasonic flaw detection card 10 collects echo data and sends the echo data back to the computer 1 for analysis.

The plurality of positioning blocks 701 are capable of moving and contacting with an inner wall of the big end hole, and stop moving after contacting with the inner wall of the big end hole, the connecting rod body fixture 8 is capable of moving and clamping the connecting rod 5, and the ultrasonic probe 3 is capable of moving to attach to the connecting rod bushing 9.

Each positioning block 701 is provided with a positioning block sliding rail, and the positioning block 701 is capable of moving along the corresponding sliding rail.

When the device for detecting the fitting degree of the connecting rod bushing 9 by the ultrasonic wave works, the plurality of positioning blocks 701 move at a constant speed from the common point to a direction far away from the common point.

An included angle between two adjacent positioning blocks 701 in the transverse section is less than or equal to 120 degrees.

The connecting rod body fixture 8 comprises two clamping blocks 801 arranged oppositely.

A longitudinal section of the clamping block 801 is arc-shaped.

Three positioning blocks 701 are provided, and an included angle between adjacent positioning blocks 701 in the transverse section is 120 degrees.

The clamping block 801 is an elastomer or an elastomer is arranged on the arc-shaped inner wall of the clamping block 801, so that the connecting rods 5 with different models can be clamped.

Embodiment 5

According to one specific embodiment of the present invention, a method for detecting a fitting degree of a connecting rod bushing by an ultrasonic wave of the present invention is described in detail hereinafter.

The present invention provides a method for detecting a fitting degree of a connecting rod bushing 8 by an ultrasonic wave, which uses the device for detecting the fitting degree of the connecting rod 5 bushing by the ultrasonic wave according to any one of the items above, and comprises the following steps of:

manufacturing a standard sample and measuring a standard ultrasonic echo signal of fitting of the connecting rod bushing 9 in the standard sample;

making the plurality of positioning blocks 701 move towards the inner wall of the big head hole at the constant speed, and making the plurality of positioning blocks stop moving after contacting with an interior of the big head hole;

making the connecting rod body fixture 8 move and clamp a connecting rod 5 to be detected;

making the ultrasonic probe 3 move to contact with the bushing 9;

stimulating the ultrasonic probe 3 to emit the ultrasonic wave by signal of a certain detection point of the connecting rod 5 to be detected by the ultrasonic flaw detection card 10;

comparing the acquired ultrasonic echo signal of the certain detection point of the connecting rod 5 to be detected with the standard ultrasonic echo signal, and if a difference between the two signals exceeds a preset threshold, judging that the detection point is not fitted, otherwise, the detection point is fitted;

detecting a plurality of detection points one by one and judging whether the detection points are fitted; and calculating a ratio of a total number of the fitted detection points to a total number of all detection points to obtain the fitting degree of the connecting rod bushing 9.

Embodiment 6

The present invention provides a method for detecting a fitting degree of a connecting rod bushing 8 by an ultrasonic wave, which uses the device for detecting the fitting degree of the connecting rod 5 bushing by the ultrasonic wave according to any one of the items above, and comprises the following steps of:

manufacturing a standard sample and measuring a standard ultrasonic echo signal of fitting of the connecting rod bushing 9 in the standard sample;

making the plurality of positioning blocks 701 move towards the inner wall of the big head hole at the constant speed, and making the plurality of positioning blocks stop moving after contacting with an interior of the big head hole;

making the connecting rod body fixture 8 move and clamp a connecting rod 5 to be detected;

making the ultrasonic probe 3 move to contact with the bushing 9;

stimulating the ultrasonic probe 3 to emit the ultrasonic wave by signal of a certain detection point of the connecting rod 5 to be detected by the ultrasonic flaw detection card 10;

comparing the acquired ultrasonic echo signal of the certain detection point of the connecting rod 5 to be detected with the standard ultrasonic echo signal, and if a difference between the two signals exceeds a preset threshold, judging that the detection point is not fitted, otherwise, the detection point is fitted;

detecting a plurality of detection points one by one and judging whether the detection points are fitted; and calculating a ratio of a total number of the fitted detection points to a total number of all detection points to obtain the fitting degree of the connecting rod bushing 9.

Embodiment 7

The present invention provides a method for detecting a fitting degree of a connecting rod bushing 8 by an ultrasonic wave, which uses the device for detecting the fitting degree of the connecting rod 5 bushing by the ultrasonic wave according to any one of the items above, and comprises the following steps of:

manufacturing a standard sample and measuring a standard ultrasonic echo signal of fitting of the connecting rod bushing 9 in the standard sample;

making the plurality of positioning blocks 701 move towards the inner wall of the big head hole at the constant speed, and making the plurality of positioning blocks stop moving after contacting with an interior of the big head hole;

making the connecting rod body fixture 8 move and clamp a connecting rod 5 to be detected;

making the ultrasonic probe 3 move to contact with the bushing 9;

stimulating the ultrasonic probe 3 to emit the ultrasonic wave by signal of a certain detection point of the connecting rod 5 to be detected by the ultrasonic flaw detection card 10;

comparing the acquired ultrasonic echo signal of the certain detection point of the connecting rod 5 to be detected with the standard ultrasonic echo signal, and if a difference between the two signals exceeds a preset threshold, judging that the detection point is not fitted, otherwise, the detection point is fitted;

detecting a plurality of detection points one by one and judging whether the detection points are fitted; and calculating a ratio of a total number of the fitted detection points to a total number of all detection points to obtain the fitting degree of the connecting rod bushing 9.

The standard sample is a cuboid in a preset length-width range and a preset thickness range which is manufactured with a material of the connecting rod 5 and a material of the bushing 9 respectively.

A matching state of the bushing in a small head hole of the connecting rod 5 is simulated by applying a pressure to one side of the material of the bushing 9 in the standard sample.

The pressure P is calculated by the following formula:

$$P = \frac{\Delta}{d} \times \frac{1}{\dfrac{\left(\dfrac{d^2+d_1^2}{d^2-d_1^2}-\mu_1\right)}{E_1} + \dfrac{\left(\dfrac{d_2^2+d^2}{d_2^2-d^2}-\mu_2\right)}{E_2}}$$

wherein:

$\Delta$ is a magnitude of interference, which is specifically a difference between an outer diameter of the bushing and an inner diameter of the small head hole of the connecting rod;

$E_1$ and $E_2$ are elastic moduli of the material of the bushing and the material of the connecting rod respectively;

$\mu_1$ and $\mu_2$ are Poisson's ratios of the material of the bushing and the material of the connecting rod respectively;

$d_1$ and $d_2$ are an inner diameter of the bushing and an outer diameter of the small head hole respectively;

d is a nominal size of the outer diameter of the bushing or the inner diameter of the small head hole of the connecting rod; and P is a surface pressure of the bushing or the small head hole of the connecting rod.

The above are only the preferred embodiments of the present invention and are not intended to limit the present invention. For those skilled in the art, the present invention may have various modifications and changes. Any modification, equivalent substitution and improvement made within the spirit and principle of the present invention are included in the scope of protection of the present invention.

We claim:

1. A device for detecting a fitting degree of a connecting rod bushing by an ultrasonic wave, a connecting rod being placed on the device for detecting the fitting degree of the connecting rod bushing by the ultrasonic wave when in use, wherein the device comprises a mobile platform, a rack, a fixture assembly and a detection assembly;

the rack comprises a top portion, a bottom portion and a side wall;

and the side wall is provided with an opening on an opposite side, and the top portion and the bottom portion are opposite, and are both perpendicular to the side wall;

the mobile platform is mounted on the top portion of the rack;

the fixture assembly comprises a big head hole fixture, a connecting rod body fixture and a fixture base;

the detection assembly comprises an ultrasonic flaw detection card, an ultrasonic probe and a computer;

the big head hole fixture comprises a plurality of positioning blocks, the positioning blocks in a transverse section have a common point, and the common point is located in a center of circle of the big head hole when the connecting rod is placed on the device for detecting the fitting degree of the connecting rod bushing by the ultrasonic wave;

the fixture base is arranged on an upper surface of the bottom portion of the rack, the ultrasonic probe is arranged at a lower end of the mobile platform, and the ultrasonic probe is capable of moving up-down and left-right, and is capable of rotating;

the big head hole fixture and the connecting rod body fixture are arranged on an upper surface of the fixture base;

the ultrasonic probe is connected with the ultrasonic flaw detection card, the ultrasonic flaw detection card is connected with the computer, the ultrasonic flaw detection card is capable of stimulating the ultrasonic probe to emit the ultrasonic wave, and the ultrasonic flaw detection card collects echo data and sends the echo data back to the computer for analysis; and the plurality of positioning blocks are capable of moving and contacting with an inner wall of the big end hole, and stop moving after contacting with the inner wall of the big end hole, the connecting rod body fixture is capable of moving and clamping the connecting rod, and the ultrasonic probe is capable of moving to attach to the connecting rod bushing.

2. The device for detecting the fitting degree of the connecting rod bushing by the ultrasonic wave according to claim 1, wherein each positioning block is provided with a positioning block sliding rail, and the positioning block is capable of moving along the corresponding sliding rail.

3. The device for detecting the fitting degree of the connecting rod bushing by the ultrasonic wave according to claim 2, wherein when the device for detecting the fitting degree of the connecting rod bushing by the ultrasonic wave works, the plurality of positioning blocks move at a constant speed from the common point to a direction far away from the common point.

4. The device for detecting the fitting degree of the connecting rod bushing by the ultrasonic wave according to claim 1, wherein an included angle between two adjacent positioning blocks in the transverse section is less than or equal to 120 degrees.

5. The device for detecting the fitting degree of the connecting rod bushing by the ultrasonic wave according to claim 4, wherein three positioning blocks are provided, and an included angle between adjacent positioning blocks in the transverse section is 120 degrees.

6. The device for detecting the fitting degree of the connecting rod bushing by the ultrasonic wave according to claim 1, wherein the connecting rod body fixture comprises two clamping blocks arranged oppositely.

7. The device for detecting the fitting degree of the connecting rod bushing by the ultrasonic wave according to claim 6, wherein a longitudinal section of the clamping block is arc-shaped.

8. The device for detecting the fitting degree of the connecting rod bushing by the ultrasonic wave according to claim 7, wherein the clamping block is an elastomer or an elastomer is arranged on an arc-shaped inner wall of the clamping block.

9. A method for detecting a fitting degree of a connecting rod bushing by an ultrasonic wave, using the device for detecting the fitting degree of the connecting rod bushing by the ultrasonic wave according to claim 1, and comprising the following steps of:

manufacturing a standard sample and measuring a standard ultrasonic echo signal of fitting of the connecting rod bushing in the standard sample;

making the plurality of positioning blocks move towards the inner wall of the big head hole at the constant speed, and making the plurality of positioning blocks stop moving after contacting with an interior of the big head hole;

making the connecting rod body fixture move and clamp a connecting rod to be detected;

making the ultrasonic probe move to contact with the bushing;

stimulating the ultrasonic probe to emit the ultrasonic wave by the ultrasonic flaw detection card, and acquiring an ultrasonic echo signal of a certain detection point of the connecting rod to be detected by the ultrasonic flaw detection card;

comparing the acquired ultrasonic echo signal of the certain detection point of the connecting rod to be detected with the standard ultrasonic echo signal, and if a difference between the two signals exceeds a preset threshold, judging that the detection point is not fitted, otherwise, the detection point is fitted;

detecting a plurality of detection points one by one and judging whether the detection points are fitted; and calculating a ratio of a total number of the fitted detection points to a total number of all detection points to obtain the fitting degree of the connecting rod bushing.

10. The method for detecting the fitting degree of the connecting rod bushing by the ultrasonic wave according to claim 9, wherein the standard sample is a cuboid in a preset length-width range and a preset thickness range which is manufactured with a material of the connecting rod and a material of the bushing respectively.

11. The method for detecting the fitting degree of the connecting rod bushing by the ultrasonic wave according to claim 10, wherein a matching state of the bushing in a small head hole of the connecting rod is simulated by applying a pressure to one side of the material of the bushing in the standard sample.

12. The method for detecting the fitting degree of the connecting rod bushing by the ultrasonic wave according to claim 11, wherein the pressure is calculated by the following formula:

$$P = \frac{\Delta}{d} \times \frac{1}{\frac{\left(\frac{d^2 + d_1^2}{d^2 - d_1^2} - \mu_1\right)}{E_1} + \frac{\left(\frac{d_2^2 + d^2}{d_2^2 - d^2} - \mu_2\right)}{E_2}}$$

wherein:

$\Delta$ is a magnitude of interference, which is specifically a difference between an outer diameter of the bushing and an inner diameter of the small head hole of the connecting rod;

$E_1$ and $E_2$ are elastic moduli of the material of the bushing and the material of the connecting rod respectively;

$\mu_1$ and $\mu_2$ are Poisson's ratios of the material of the bushing and the material of the connecting rod respectively;

$d_1$ and $d_2$ are an inner diameter of the bushing and an outer diameter of the small head hole respectively;

d is a nominal size of the outer diameter of the bushing or the inner diameter of the small head hole of the connecting rod; and P is a surface pressure of the bushing in the standard sample.

\* \* \* \* \*